(12) United States Patent
Fedullo

(10) Patent No.: US 11,308,781 B2
(45) Date of Patent: Apr. 19, 2022

(54) DATA INTERRUPTION DEVICE AND RELATED METHOD

(71) Applicants: GALDIERIAUTO S.R.L., Lancusi di Fisciano (IT); Alessandro Simplicio Fedullo, Baronissi (IT)

(72) Inventor: Alessandro Simplicio Fedullo, Baronissi (IT)

(73) Assignees: Alessandro Simplicio FEDULLO, Baronissi (IT); Galdieriauto S.R.L., Lancusi di Fisciano (IT)

( * ) Notice: Subject to any disclaimer, the term of this patent is extended or adjusted under 35 U.S.C. 154(b) by 0 days.

(21) Appl. No.: 17/258,930

(22) PCT Filed: Jul. 11, 2018

(86) PCT No.: PCT/IT2018/000098
§ 371 (c)(1),
(2) Date: Jan. 8, 2021

(87) PCT Pub. No.: WO2020/012512
PCT Pub. Date: Jan. 16, 2020

(65) Prior Publication Data
US 2021/0287508 A1    Sep. 16, 2021

(51) Int. Cl.
*G08B 19/00* (2006.01)
*G08B 13/24* (2006.01)
*B60R 25/10* (2013.01)

(52) U.S. Cl.
CPC ...... *G08B 13/2494* (2013.01); *B60R 25/1004* (2013.01)

(58) Field of Classification Search
CPC .... G08B 13/2494; G08B 21/00; H04B 3/542; H04B 3/56; B60R 1/04
See application file for complete search history.

(56) References Cited

U.S. PATENT DOCUMENTS

2003/0179080 A1* 9/2003 Mollenkopf ........... H04B 3/542
455/402

* cited by examiner

*Primary Examiner* — Julie B Lieu
(74) *Attorney, Agent, or Firm* — E. Eric Mills; Nexsen Pruet, PLLC

(57) ABSTRACT

A data interruption device (1) is described, between a plurality of control units (2) communicating through at least one communication protocol (6), designed to produce an electromagnetic interference inhibiting a data communication between the plurality of control units (2); moreover, the device (1) is equipped with at least one transformer (3) designed to transfer at least one signal on at least one transmission means (5) of the communication protocol (6), inducing such electromagnetic interference.

10 Claims, 4 Drawing Sheets

DATA INTERRUPTION DEVICE AND RELATED METHOD

CROSS REFERENCE TO RELATED APPLICATIONS

This application is a 35 U.S.C. § 371 U.S. national phase entry of International Application No. PCT/IT2018/000098 having an international filing date of Jul. 11, 2018, the contents of which are incorporated herein by reference in its entirety.

The present invention refers to a data interruption device, in particular in the automotive field.

Electronic, electric and electromechanical switches are known in the art, and are suitable to stop the communication of data on filiform conductors, by shearing the filiform conductors with a mechanical or electromechanical switch, physically preventing the passage of current and voltage, or through the insertion of a device interposed in "series" or in "parallel" in the filiform conductor, obstructing the passage of electric information. The operation of such known switches needs a physical interruption of the filiform conductor dedicated to transport data.

Moreover, the physical interruptions of the filiform conductor, through truncation, do not allow safeguarding integrity and originality of the system in which the conductor is inserted, or avoiding damages during the intervention, or avoiding the loss of warranty due to a modification to the infrastructure, and the structural complexity of the transmission network.

An anti-theft device is also known in the art, equipped with a resonance circuit, composed of a coil and a capacitor, designed to detect increases and decreases of the current which crosses the system with which such device is associated, such as for example the one disclosed in patent FR2304129.

Finally, an anti-theft device is also known, which is composed of a static switch, equipped with a coil, whose correct operation or not works as signaling device of a possible theft action, such as for example the one disclosed in patent FR2705935.

Object of the present invention is solving the above prior art problems, by providing a data interruption device designed to produce an electromagnetic interference.

Another object of the present invention is providing a data interruption device capable of inhibiting the operation and the motility of a means of locomotion during an action of a fraudulent getting hold.

A further object is providing a method for managing the interrupting device, capable of enabling a remote control of the interrupting device by a user.

A last object is providing a data interruption device capable of being arranged inside the means of locomotion in any position.

The above and other objects and advantages of the invention, as will appear from the following description, are obtained with a data interruption device as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as appears from the enclosed claims.

The present invention will be better described by some preferred embodiments thereof, provided as a non-limiting example, with reference to the enclosed claims, in which:

As known, currently the electronic control units, related to the wheel anti-locking system, to the stability control system, to the engine system, to the transmission system, to the door control system, to the air conditioning system, to the lights control system, etc. are placed in the means of locomotion and connected by a data communication channel, advantageously through two-wire differential serial communication line, which allows connecting the electronic control units and to be interfaced and exchange information.

Figure 1:
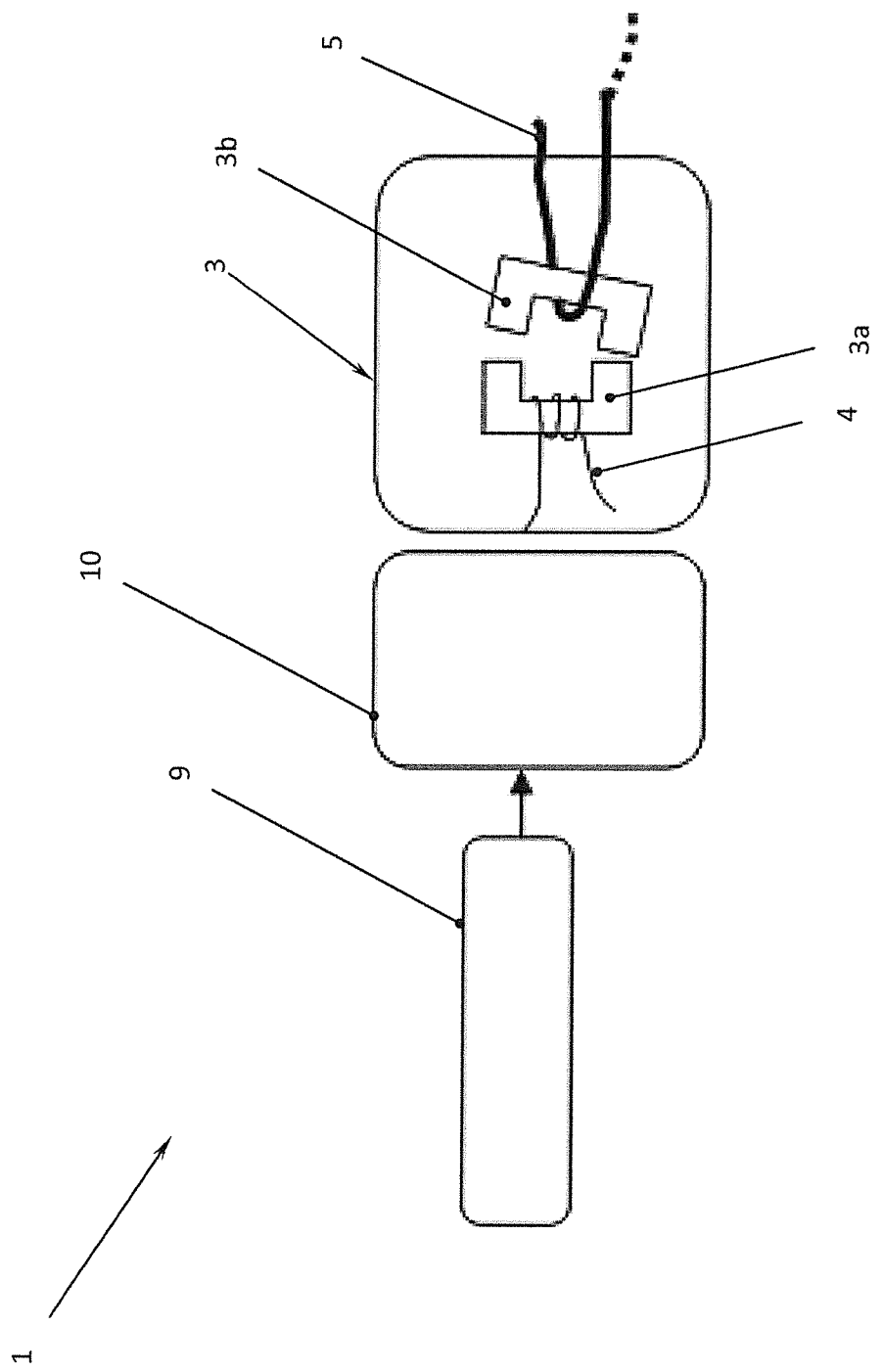
FIG. 1 shows a schematic view of an embodiment of the device according to the present invention.
Figure 2:
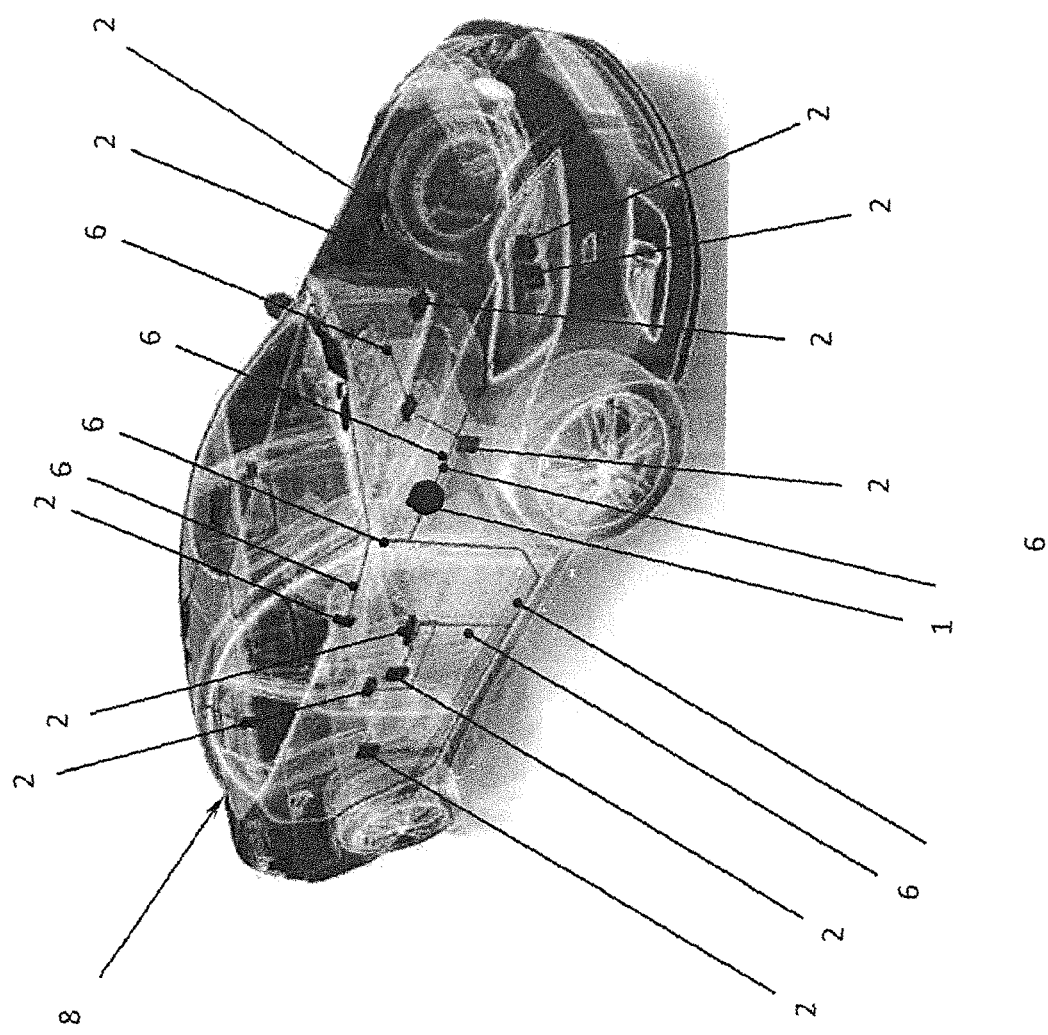
FIG. 2 shows an arrangement in a means of locomotion of the device according to the present invention.
Figure 4:
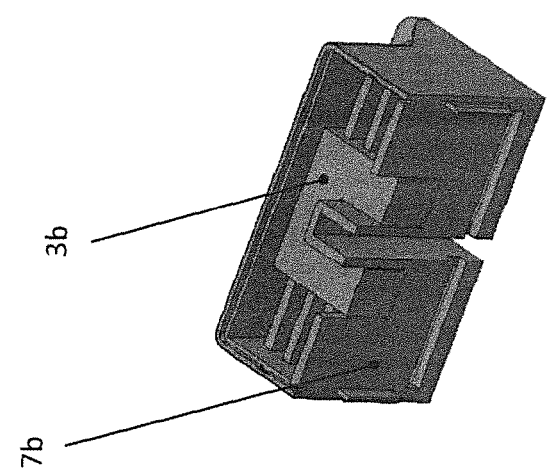
FIGS. 3, 4, 5, 6 show a three-dimensional view of some components of the device according to the present invention.
Figure 3:
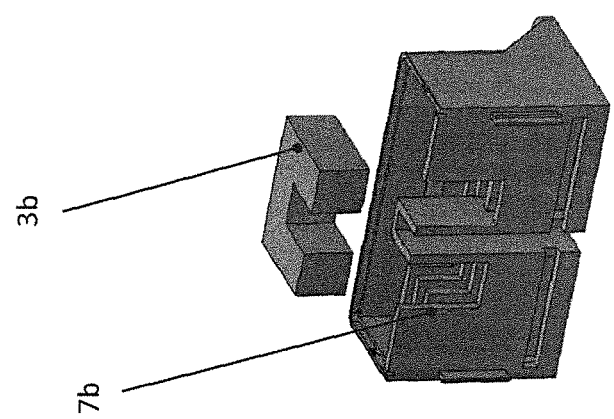
Figure 6:
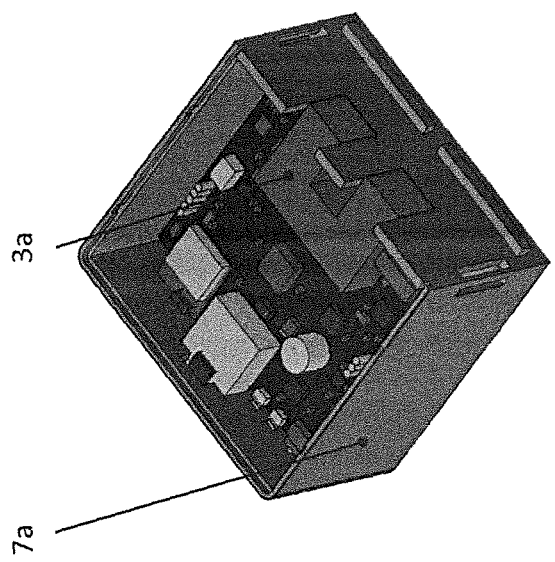
Figure 5:
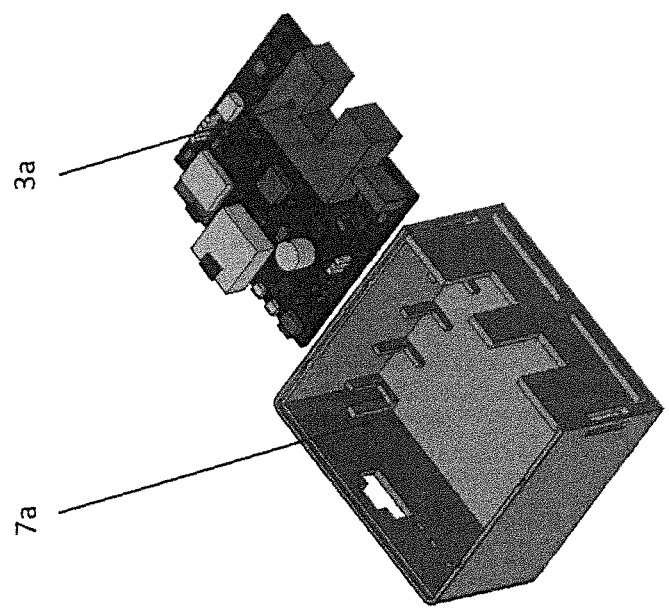

Advantageously, with reference to FIG. 1, a data interruption device 1 according to the present invention is designed to produce an electromagnetic interference, such as, for example, a signal of an electric, electromagnetic nature or other similar one, inhibiting a data communication, through a communication protocol 6, such as, for example, a controller area network (Can-bus), between a plurality of electronic control units 2 arranged preferably in a means of locomotion 8, such as, for example, a car, or a motor-vehicle, or a truck, etc., inhibiting its operation and its motility, advantageously during an action of a fraudulent getting hold of the means of locomotion 8, such as, for example, theft, break-in or other similar action.

Moreover, the device 1 according to the present invention is equipped with:

- at least one transformer 3 designed to transfer the signal on a transmission means 5 of the communication protocol 6;
- at least one managing unit designed to manage the operation of the device 1;
- a case composed of a first portion 7a, and of a second portion 7b, separate but designed to be connected during the signal transfer from the transformer 3 on the transmission means 5 of the communication protocol 6; and
- at least one control means 11, such as, for example, a transponder, a radio-control, or a mobile device through a web application or other similar one, designed to send and detect an activating and/or deactivating signal of the device 1 by a user, and equipped with a plurality of warning lights designed to point out the correct operation of the control means 11, and the correct communication thereof with the device 1.

In particular, the transformer 3 is composed of an electric conductor 4 wound on a first portion 3a made of ferromagnetic material, composing a primary winding of the transformer 3, and of the transmission means 5 wound on a second portion 3b made of ferromagnetic material, composing a secondary winding of the transformer 3, enabling a transfer of the signal, preferably of the square wave type oscillating at a frequency of about 100 kbps, from the primary winding to the secondary winding, and generating the electromagnetic interference with a voltage value Vs, preferably equal to 3V.

In particular, the supply voltage Vp of the device 1 inserted in the means of locomotion 8, is included between 12 Volt and 24 Volt, depending on the type of means of locomotion 8 in which the device 1 is inserted; moreover, since the secondary winding of the transformer 3 is composed of a single winding Ns of the transmission means 5 on the second portion 3b of the transformer 3, the primary winding on the first portion 3a of the transformer 3 is composed of a number of windings Np obtained, depending on the supply voltage Vp of the device 1 and the single winding Ns of the transmission means 5 arranged on the second portion 3b of the transformer 3, through the following relationships:

$$Np=(Vp*Ns)/Vs=(12V*1)/3V=4$$

$$Np=(Vp*Ns)/Vs=(24V*1)/3V=8.$$

Finally, the transformer 3 is equipped with a geometric configuration, assuming the shape of a U, or a C, or a I, designed to optimize its electromagnetic performances, guaranteeing a versatility during the assembling step of the transformer 3 inside the case.

As shown in FIGS. 3, 4, 5, 6, as a non-limiting example, the first portion 7a of the case is designed to contain the first portion 3a of the transformer 3, the managing unit and a supply means of the device 1, and the second portion 7b of the case is designed to contain the second portion 3b of the transformer 3.

In particular, the managing unit comprises:
a driver 10, such as, for example MIC4605-2YMT-T5, designed to manage the primary winding on the first portion 3a of the transformer 3, through a control action of two MOSFETs, preferably in a Push-Pull configuration;
at least one sensor means, such as, for example, a sensor, designed to detect a possible change of position, and/or of inclination of the means of locomotion 8, and/or a sensor designed to detect a possible vibration of the means of locomotion 8 equipped with the device 1;
a central unit 9, such as, for example a PIC18LF45K40E/MV microcontroller or other similar one, designed to manage the driver 10, and the sensor means, detecting possible data related to the possible change of position, and/or of inclination of the means of locomotion 8, and to be interfaced with the control means 11; and
electric supply means.

The method for managing the device 1 according to the present invention comprises the following steps:
activation:
providing the device 1;
activating the control means 11 and verifying the connection through Bluetooth technology or other similar one, between the control means 11 and the device 1;
communicating between the control means 11 and the device 1 a plurality of status and operation information, related, for example, to the activation status, the deactivation status, the battery level, diagnostics, etc.;
alert:
detecting by the sensor means a plurality of data related to positioning and/or inclination of the means of locomotion 8 provided inside the device 1, and/or detecting by the sensor means a plurality of data related to the vibration of the means of locomotion 8 equipped with the device 1;
sending the plurality of data to the central unit 9;
comparing such plurality of data with at least one reference value pointing out the correct positioning of the means of locomotion 8, and/or comparing such plurality of data with at least one threshold value pointing out an allowed vibration value of the means of locomotion 8;
if the result of such comparison is positive: repeating the alert phase;
if the result of such comparison is negative: activating the following alarm phase;
alarm:
activating the transformer 3 through the driver 10, and generating the signal on the secondary winding of the transformer 3;
generating the electromagnetic interference on the communication protocol 6;
interrupting the data transmission between the plurality of control units 2 arranged in the means of locomotion 8;
blocking the motility of the means of locomotion 8; and
deactivating the device 1.

The invention claimed is:

1. A data interruption device between a plurality of control units communicating through at least one communication protocol, wherein the data interruption device is configured to produce an electromagnetic interference inhibiting a data communication between the plurality of control units, the device being equipped with at least one transformer configured to transfer at least one signal on at least one transmission means of the communication protocol, inducing the electromagnetic interference.

2. The device of claim 1, wherein the transformer is composed of at least one electric conductor wound on a first portion of the transformer, composing a primary winding of said transformer, and of at least one transmission means of the communication protocol wound on a second portion, composing a secondary winding of the transformer, enabling the transfer of the at least one signal, from the primary winding to the secondary winding, and generating the electromagnetic interference with a voltage value (Vs).

3. The device of claim 1, wherein the device is arranged in a means of locomotion and configured to inhibit the operation and/or the motility of the means of locomotion, during an action of a fraudulent getting hold of the means of locomotion.

4. The device of claim 1, further comprising:
at least one managing unit designed to manage operation of the device;
a case composed of a first portion and a second portion configured to be connected during transfer of the signal from the transformer on the transmission means of the communication protocol; and
at least one control means, configured send and detect an activating and/or deactivating signal of the device by at least one user, and comprising a plurality of warning lights to indicate the correct operation of the control means, and a correct communication of the control means with the device.

5. The device of claim 2, wherein the secondary winding of the transformer comprises a single winding (Ns) of the transmission means on the second portion of the transformer.

6. The device of claim 2, wherein the primary winding on the first portion of the transformer comprises a number of windings (Np) obtained based on the supply voltage (Vp) of the device, the voltage value (Vs) of the electromagnetic interference, and the single winding (Ns) of the transmission means arranged on the second portion of the transformer according to Np=(Vp*Ns)/Vs.

7. The device of claim 2, wherein the first portion of the case is configured to contain the first portion of the transformer, the managing unit, and a supply means of the device.

8. The device of claim 2, wherein the second portion of the case is configured to contain the second portion of the transformer.

9. The device of claim 4, wherein the managing unit comprises:
- at least one driver to manage the primary winding on the first portion of the transformer;
- at least one sensor means to detect a possible change of position and/or inclination of the means of locomotion and/or a possible vibration of the means of locomotion;
- a central unit to manage the driver and the sensor means, and detect data related to the possible change of position and/or inclination of the means of locomotion, and to be interfaced with the control means; and
- a supply means.

10. A method for managing a data interruption device of claim 1 comprising:
- providing the device;
- activating the control means and verifying the connection between the control means and the device;
- communicating, between a control means and the device, a plurality of status and operation information;
- initiating an alert phase comprising:
- detecting, by the sensor means, a plurality of data related to positioning and/or inclination of the means of locomotion and/or detecting, by the sensor means a plurality of data related to vibration of the means of locomotion;
- sending the plurality of data to a central unit;
- comparing the plurality of data with at least one reference value indicating a correct positioning of the means of locomotion, and/or comparing said plurality of data with at least one threshold value indicating an allowed vibration value of the means of locomotion;
- if the result of said comparison is positive: repeating the alert phase;
- if the result of said comparison is negative: activating an alarm phase comprising:
- activating the transformer and generating the signal on the secondary winding of the transformer;
- generating the electromagnetic interference on the communication protocol;
- interrupting the data transmission between the plurality of control units;
- blocking the motility of the means of locomotion; and
- deactivating the device.

* * * * *